March 3, 1953  R. M. GOODWIN  2,630,144
WIRE SPLICING APPARATUS
Filed Feb. 25, 1948  8 Sheets-Sheet 1
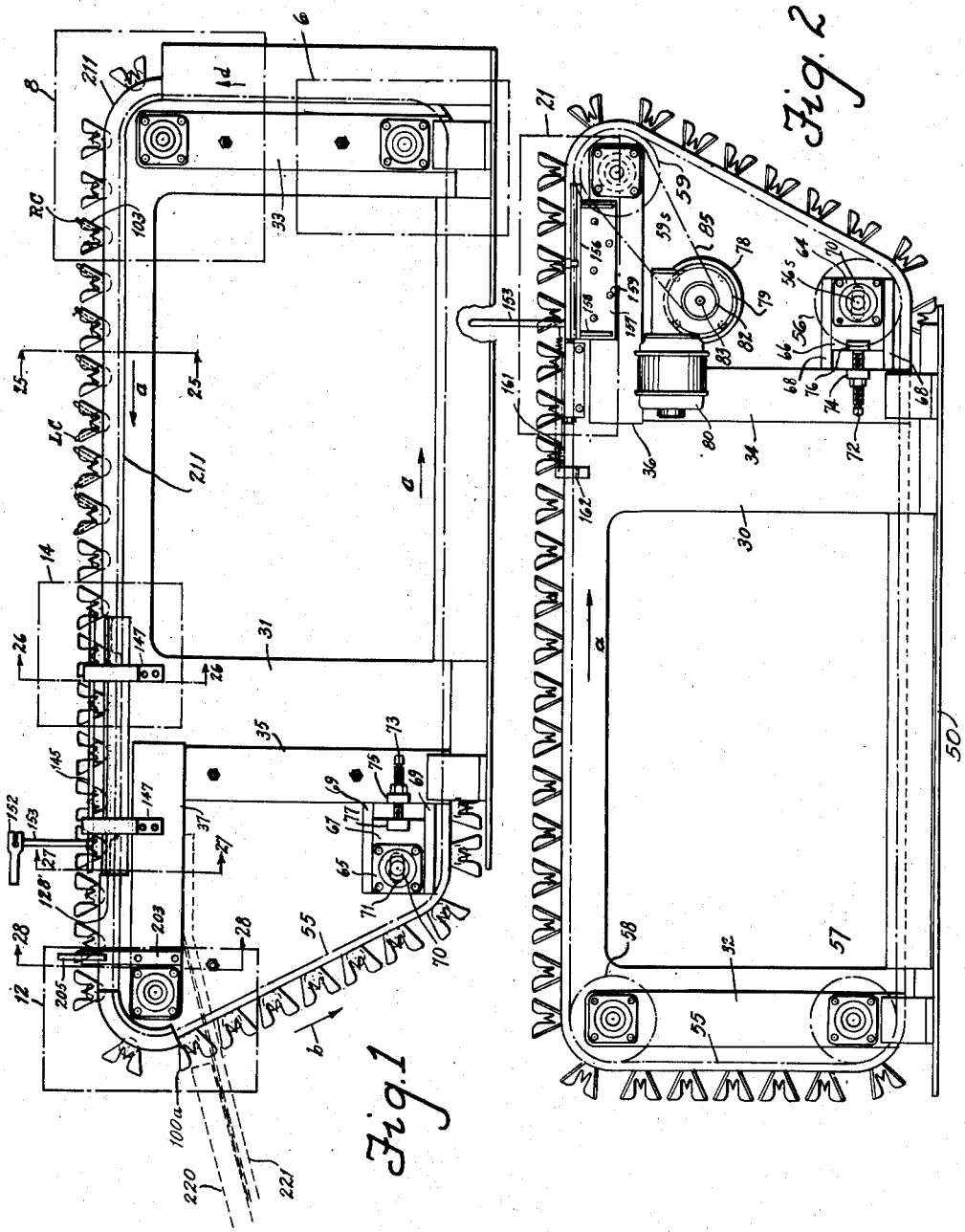
INVENTOR.
Richard M. Goodwin
BY
Spencer Hardman & Fehr
his attorneys

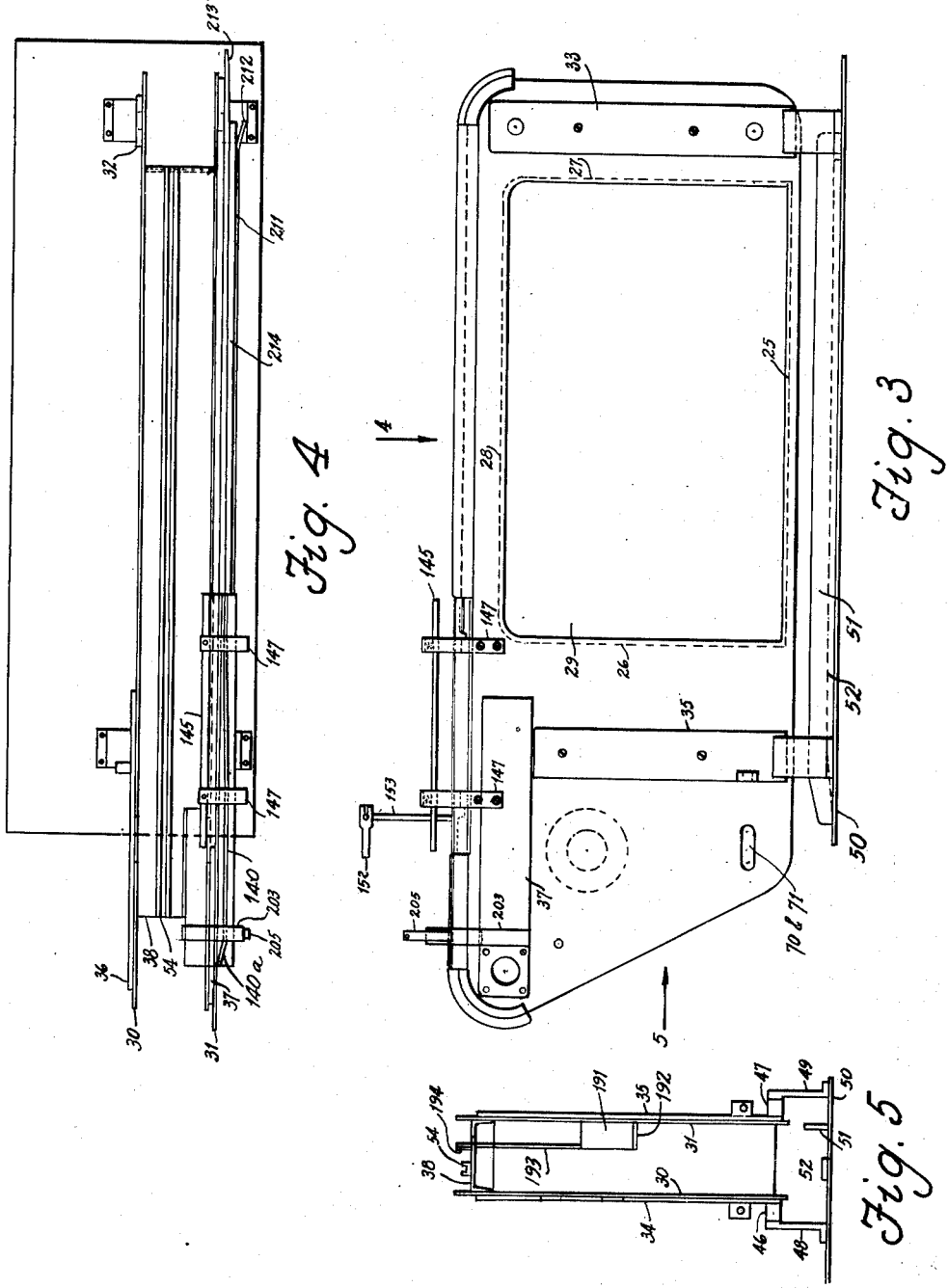

March 3, 1953 R. M. GOODWIN 2,630,144
WIRE SPLICING APPARATUS
Filed Feb. 25, 1948 8 Sheets-Sheet 3
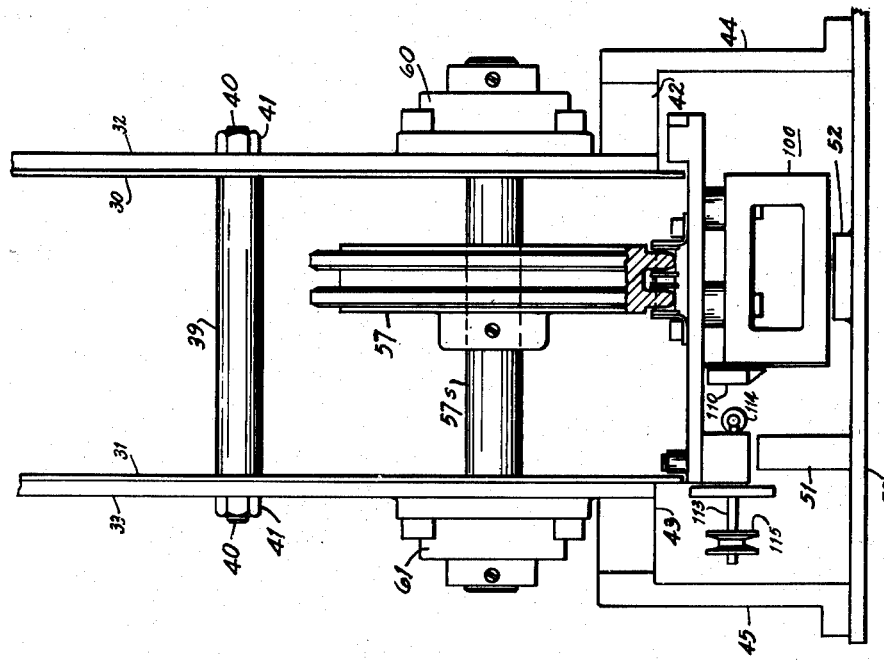
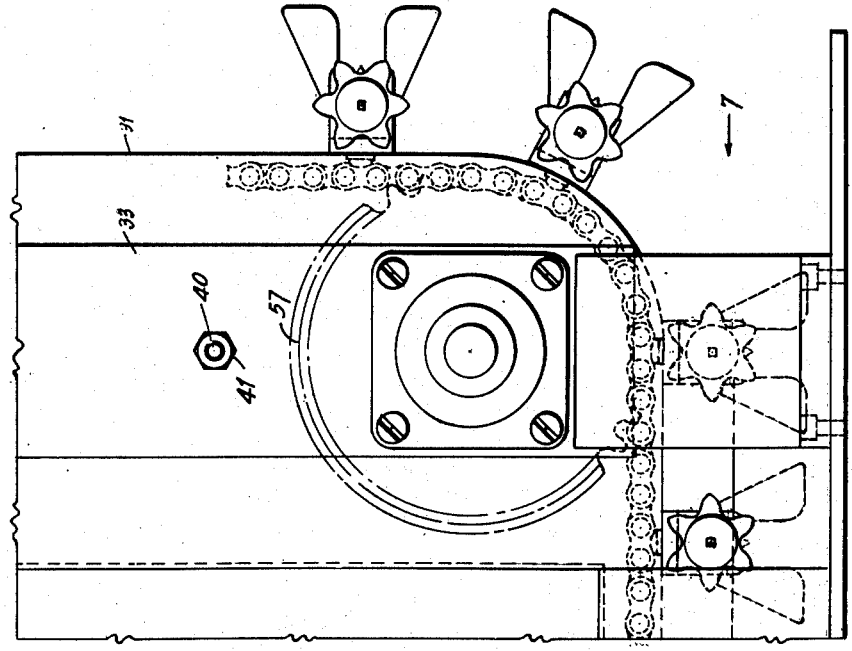
INVENTOR.
Richard M. Goodwin
BY
Spencer Hardman & Fehr
his attorneys March 3, 1953 R. M. GOODWIN 2,630,144
WIRE SPLICING APPARATUS
Filed Feb. 25, 1948 8 Sheets-Sheet 4

INVENTOR.
Richard M. Goodwin
by Spencer
Hardman and Feher
his attorneys

March 3, 1953 — R. M. GOODWIN — 2,630,144
WIRE SPLICING APPARATUS
Filed Feb. 25, 1948 — 8 Sheets-Sheet 5

INVENTOR.
Richard M. Goodwin
BY Spencer Hardman & Fehr
his attorneys

March 3, 1953  R. M. GOODWIN  2,630,144
WIRE SPLICING APPARATUS
Filed Feb. 25, 1948  8 Sheets-Sheet 6
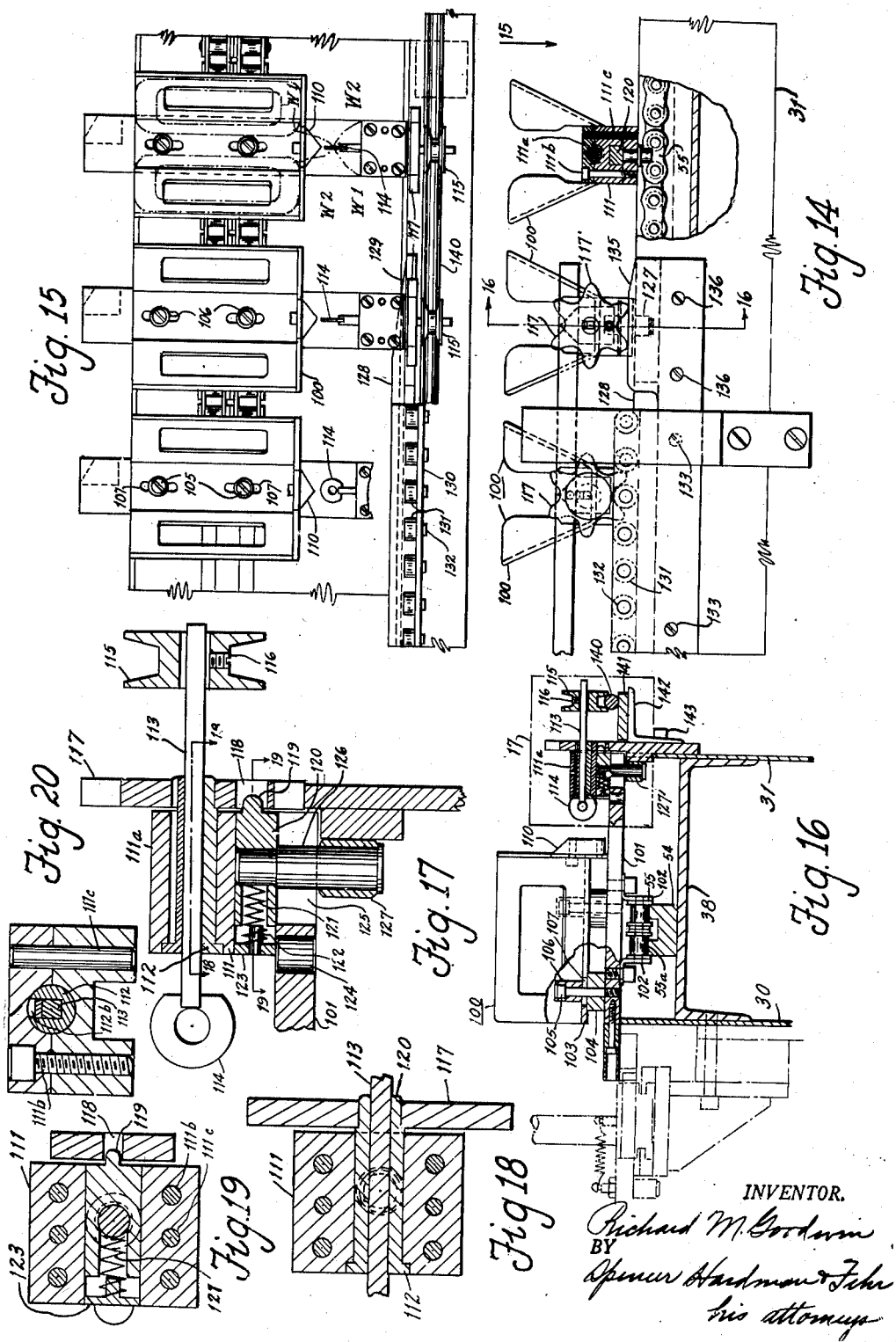

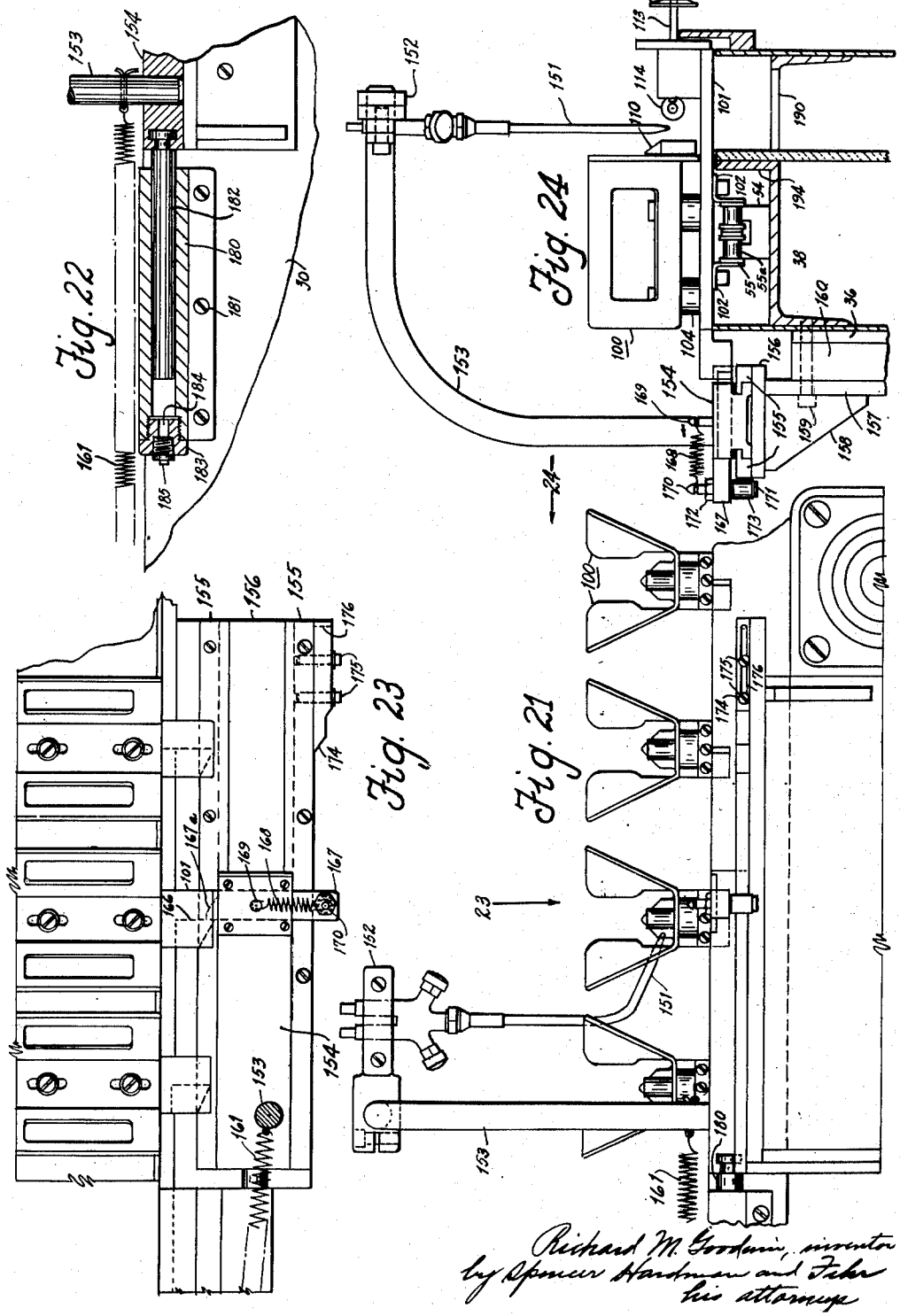

March 3, 1953 — R. M. GOODWIN — 2,630,144
WIRE SPLICING APPARATUS
Filed Feb. 25, 1948 — 8 Sheets-Sheet 8
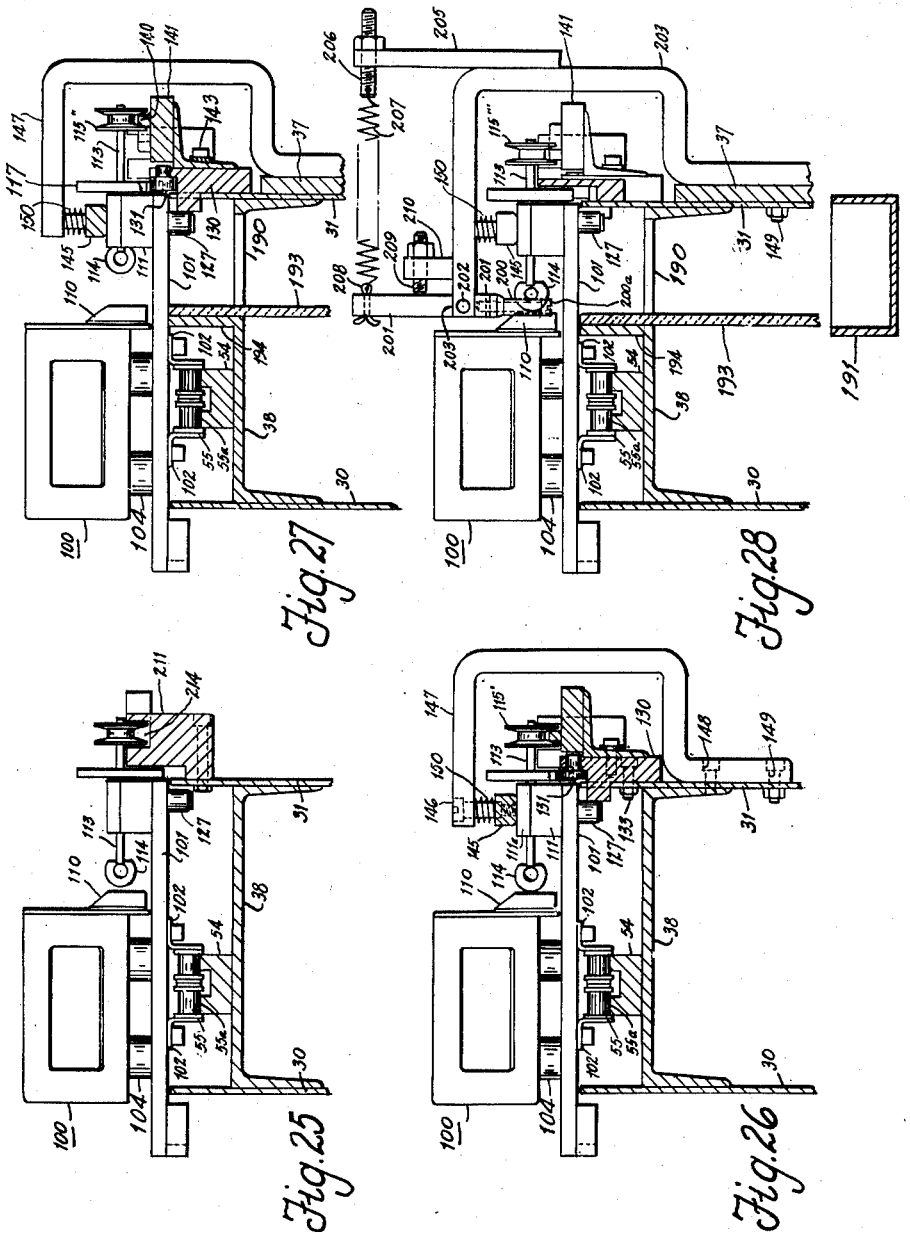
INVENTOR.
Richard M. Goodwin
BY Spencer Hardman & Fehr
his attorneys Patented Mar. 3, 1953

2,630,144

UNITED STATES PATENT OFFICE 2,630,144

WIRE SPLICING APPARATUS

Richard M. Goodwin, Anderson, Ind., assignor to General Motors Corporation, Detroit, Mich., a corporation of Delaware Application February 25, 1948, Serial No. 10,652

5 Claims. (Cl. 140—2)

1

This invention relates to the splicing of lead wires of electrical parts such as generator field coils and an object of the invention is to provide a machine by which splicing is facilitated. In the disclosed embodiment thereof the invention provides a conveyor having a plurality of work-holders each adapted to receive two electrical parts having lead wires to be joined, a plurality of wire twisting devices each associated with a work-holder and having an element for receiving the lead wires to be twisted, means for effecting the operation of the lead wire twisting devices as the conveyor moves along, and means for permanently uniting the lead wires by melting them together.

Further objects and advantages of the present invention will be apparent from the following description, reference being had to the accompanying drawings wherein a preferred embodiment of the present invention is clearly shown.

In the drawings:

Fig. 1 is a front view of a mechanism embodying the invention;

Fig. 2 is a rear view;

Fig. 3 is a front view of the machine frame and non-movable parts supported thereby;

Fig. 4 is a plan view in the direction of arrow 4 of Fig. 3;

Fig. 5 is an end view in the direction of arrow 5 of Fig. 3;

Fig. 6 is an enlargement of that portion of the machine included within the dot dash rectangle 6 of Fig. 2;

Fig. 7 is a view in the direction of arrow 7 of Fig. 6;

Fig. 14 is an enlargement of that portion of Fig. 1 within the dot-dash rectangle 14;

Fig. 15 is a view in the direction of arrow 15 of Fig. 14;

Fig. 16 is a sectional view on the line 16—16 of Fig. 14;

2

Figures 8, 9, 10, 11:
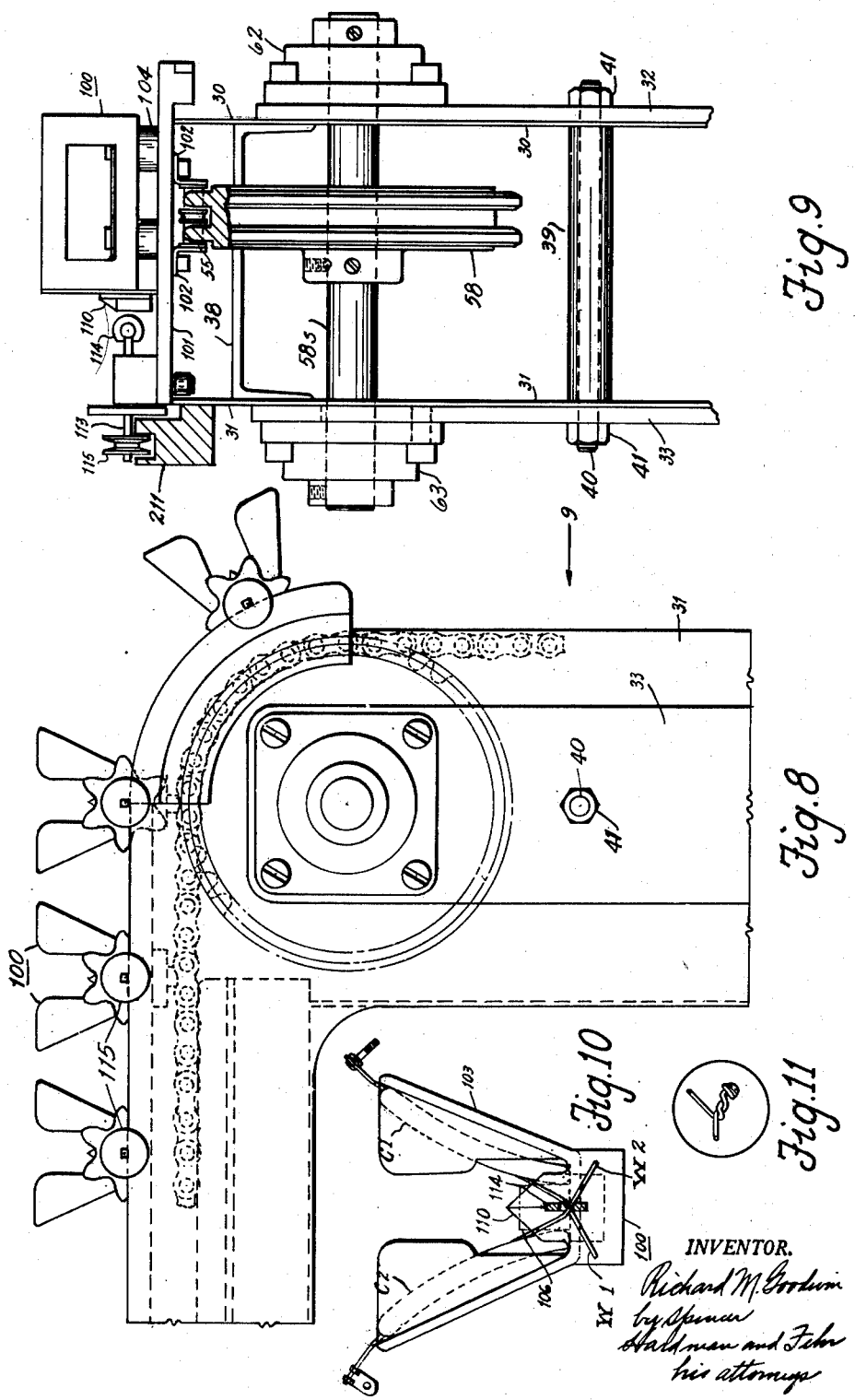
Fig. 8 is an enlargement of that portion of the machine included within the dot-dash rectangle 8 of Fig. 1.
Fig. 9 is a view in the direction of the arrow 9 of Fig. 8.
Fig. 10 is an enlarged view of the carrier showing coils in place for twisting wire leads.
Fig. 11 is an enlarged view of wire leads twisted and fused together.

Fig. 17 is an enlargement of that portion of Fig. 16 within the dot-dash rectangle 17 of Fig. 16;

Fig. 18 is a fragmentary sectional view on the line 18—18 of Fig. 17;

Fig. 19 is a sectional view on the line 19—19 of Fig. 17;

Fig. 20 is a sectional view on the line 20—20 of Fig. 18;

Figs. 21 and 22 together provide an enlargement of that portion of Fig. 2 within the dot-dash rectangle 21 of Fig. 2; a part of Fig. 22 being in section on the line 22—22 of Fig. 23;

Fig. 23 is a view in the direction of arrow 23 of Fig. 21;

Fig. 24 is a view in the direction of arrow 24 of Fig. 21;

Figs. 25, 26, 27 and 28 are fragmentary sectional views respectively on the lines 25—25, 26—26, 27—27 and 28—28 of Fig. 1.

Referring to Figs. 3, 4 and 5, the machine frame comprises side plates 30 and 31, each having a rectangular opening 29 (Fig. 3). At the edges of their openings 29, these plates are joined to plates 28, 27, 26 and 25 thus providing leg room for operators who are seated on stools in front of the machine (Figs. 1 and 3) and whose feet rest upon the plate 25. The plates 30 and 31 are welded to plates 32 and 33 respectively and to plates 34 and 35 respectively and to plates 36 and 37 respectively. Near the top thereof the plates 30 and 31 are connected by a channel 38 which extends longitudinally. Plates 30 and 31 are maintained in spaced relation also by spacer rods 39 (Fig. 7) through which bolts 40 extend. Each of said bolts threadedly receive nuts 41 which when tightened against the reenforcing plates such as 32 and 33 (Fig. 7) for example, force the plates 30 and 31 against the spacer 39.

As shown in Fig. 7 plates 32 and 33 are welded to spacers 42 and 43 respectively which are welded to brackets 44 and 45 respectively which are attached to a base 50 which supports longitudinally extending plates 51 and 52 having functions to be described. Plates 34 and 35 are welded respectively to spacers 46 and 47 (Fig. 5) which are welded to brackets 48 and 49 respectively which are secured to the base 50. Channel 38 (Figs. 4 and 5) supports a conveyor chain track 54 which supports and guides an endless double chain 55 represented by the dot-dash line 55 in Figs. 1 and 2. Chain 55 passes around four double sprockets 56, 57, 58 and 59. Sprocket 57 (Figs. 6 and 7) is supported by a shaft 57s journaled in bearings 60 and 61 supported respectively by plates 32 and 33. Sprocket 58 (Figs. 8 and 9) is supported by a shaft 58s journaled in bearings 62 and 63 supported respectively by plates 32 and 33. Sprocket 56 (Figs. 1 and 2) is supported by a shaft 56s journaled in bearings 64 (Fig. 2) and 65 (Fig. 1) supported by plates 66 and 67 respectively guided by parallel ways 68 and 69 respectively which slide across slots 70 and 71 respectively (Figs. 2 and 3) in plates 30 and 31 respectively. These slots receive the shaft 56s. The chain 55 can be tightened by turning screws 72 and 73 respectively threaded through lugs 74 and 75 respectively welded to plates 34 and 35 respectively and engaging lugs 76 and 77 respectively welded to plates 66 and 67 respectively.

Figures 12, 13:
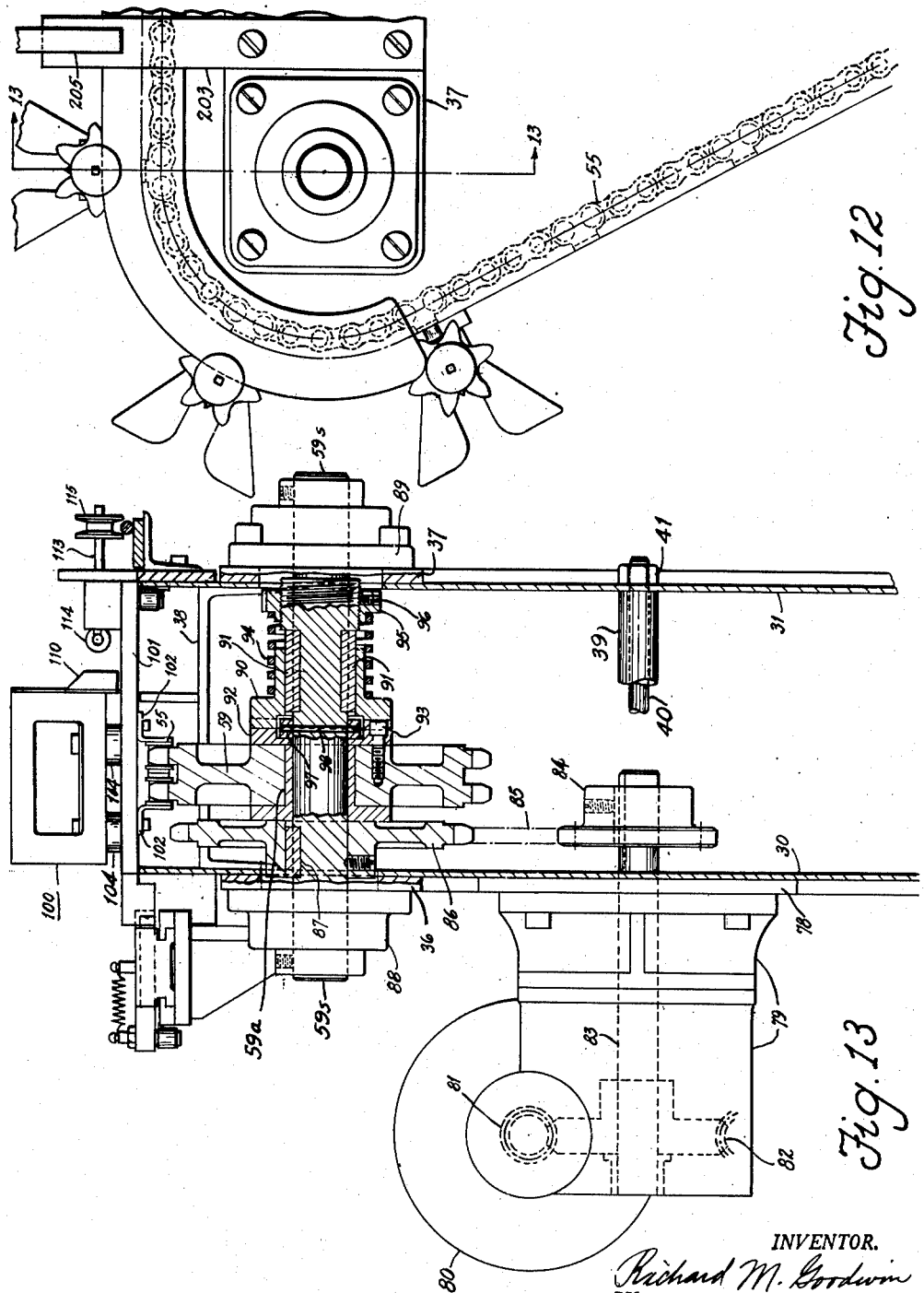
Fig. 12 is an enlargement of that portion of Fig. 1 within the dot-dash rectangle 12.
Fig. 13 is a sectional view on the line 13—13 of Fig. 12.

The plate 30 (Figs. 2 and 13) provides a mounting pad 78 for the gear reducer housing 79 which supports an electric motor 80. Motor 80 drives a worm 81 meshing with a worm wheel 82 which drives a shaft 83 connected by a sprocket 84, a chain 85 and a sprocket 86 with a shaft 59s which is supported by bearings 88 and 89 supported by plates 36 and 37 respectively. Key 87 connects sprocket 86 with shaft 59s. Sprocket 59 is not directly connected with shaft 59s but through a torque limiting clutch which comprises a driving member 90 that is connected with shaft 59s by keys 91 which provide a longitudinal spline connection between the shaft and the member 90. The member 90 has teeth for engaging a toothed member 92 which screws 93 attach to the sprocket 59 which carries a bushing 59a. Bushing 59a supporting sprocket 59 also acts as spacer between sprockets 86 and 59 journaled on the shaft 59s. Clutch member 90 is urged into engagement with clutch member 92 by a spring 94 retained under compression by a nut 95 threadedly connected with the shaft 59s and prevented from turning by a set screw 96. Independently of the clutch member 90, lateral motion of the gear 59 is limited by a ring 97 connected with shaft 59s by a pin 98. The direction of the movement of the conveyor is indicated by arrows a, b, c and d (Figs. 1 and 2). In case such movement is accidentally stopped while the motor 80 is running, the clutch member 90 will separate from the clutch member 92 against the action of spring 94 which is adjusted by the nut 95 so that the clutch will transmit the torque normally required for movement of the conveyor.

The conveyor chain 55 moves a plurality of work-holders 100 (Fig. 13) each comprising a base plate 101 connected with the conveyor chain by angles 102. Each plate 101 supports a tray 103 (Fig. 16) for receiving two electrical parts such as field coils having lead wires to be joined. Tray 103 is spaced from the base 101 by washers 104. Screws 105 pass through washers 106, slots 107 in tray 103 and through the spacing washers 104 and are threaded into the base 101. As shown in Figs. 10 and 15 the coils C1 and C2 which are placed in a workholder engage the washers 106 which maintain separation of the adjacent lower portions of the coils. By loosening screws 105 the tray can be adjusted transversely of chain 55. The chain has rollers 55a which engage the track 54 thereby supporting the conveyor and workholders on the upper run.

Each tray 103 carries a block 110 (Figs. 15 and 16) of somewhat triangular formation. Bar 101 carries a block 111 supporting a cap 111a connected with the block 111 by screws 111b and dowel pins 111c. Block 111 and cap 111a provide a bearing for a shaft 112 having a groove 112b rectangular in cross section receiving a square rod or shaft 113 provided at its left end (Fig. 17) with an eye 114 and attached at its right end to a grooved wheel 115 secured by a set screw 116. A bar 112a (Figs. 17 and 20) is press fitted into the groove 112b and is soldered to shaft 112 in order to prevent lateral movement of the rod 113. A pinion 117 is attached to the shaft 112. Pinion 117 is provided with a hole 118 which receives a projection 119 of a slide 120 urged into pinion locking position by a spring 121 received by recess in the slide and surrounding a pin 122 attached to a lug 123 integral with a pin 124 forced into a hole in the base 101. A notch 125 (Fig. 17) in base 101 receives a stud 126 attached to slide 120. Stud 126 carries a roller 127 for engaging cam bar 128 (Figs. 14 and 15) having an inclined surface 129. The pinion 117 is engageable with a rack comprising rollers 131 journaled on pins 132 supported by screws 133 attached to a plate 130 attached to plate 31. The locking slide 120 (Fig. 17) holds the pinion 117 normally in the position shown in Fig. 14 at 117'. While roller 127 is engaging the cam surface 129 of bar 128 to unlock the pinion 117, its teeth are engaged by a plate 135 (Fig. 14) secured by screws 136 of plate 31. As the pinion 117 leaves the upper surface of plate 135 it begins to engage the first roller 131 of the rack. Therefore the pinion 117 is turned counterclockwise as the conveyor moves in the direction of arrow a (Figs. 1 and 14). The purpose of this rotation is to twist lead wires of the electrical coils C1 and C2 which have been placed in the tray, as shown in Fig. 10. Fig. 10 also shows that these lead wires W1 and W2 have been threaded through an eye 114. While the pinion is rotated the lead wires will be twisted and the twist will run up to the block 110 and this twist will extend from the block 110 downwardly as viewed in Fig. 15, or to the right as viewed in Figs. 25 through 28, and 16. As the twist increases in length it is necessary to increase the distance between the block 110 and the eye 114. For this purpose the grooved wheel 115 engages a bar 140 which is shaped as shown in Fig. 4. As the conveyor moves the wheel 115 follows the bar 140 from a position 115' (Fig. 26) in which the eye 114 is closest to the block 110 to a position 115'' (Fig. 27) in which the eye 114 is furtherest from the block 110. Therefore, the twist of the leads W1 and W2 extends substantially straight from the block 110. A bar 140 is welded to angles 142 which screws 143 secure to plate 31. During the twisting operation the bearing caps 111a are engaged by a bar 145 into which screws 146 are threaded. These screws pass through brackets 147 which screws 148 attach to channel 38 (Fig. 26) and which screws 149 attach plate 31. Springs 150 surrounding screws 146 urge the bar 145 against the bearing caps 111a. The function of bar 145 is to hold the pinion 117 in proper engagement with the rack rollers 131 and the roller 115 in proper engagement with the track 140.

After the twisting operation the twisted lead wires are fused together by an oxy-acetylene torch 151 supported by bracket 152 supported by a bent rod 153 (Fig. 21) attached to a carriage 154 which is guided for movement parallel to the conveyor chain 55 by way bars 155 attached to a plate 156 which is welded to a plate 157 and braces 158. Plate 157 is attached by screws 159 to plate 36 and a channel 38, said screws passing through a spacer block 160 (Fig. 24). Carriage 154 is urged normally to the left (Figs. 21, 22 and 23) by a spring 161 connected with rod 153 (Fig. 22) and at the other end to a bracket 162 (Fig. 2) attached to plate 30. As the workholder moves right, as viewed in Fig. 23, it successively picks up the carriage 154. For this purpose each workholder plate 101 is provided with a surface 166 engageable with a bar 167 guided by the carriage 154 for movement transverse to the movement of the carriage. The bar 167 is maintained in the normal position shown in Fig. 23 by spring 168 attached to a pin 169 on the carriage 154 and to a pin 170 provided by the upper end of a stud 171 passing through the slide 167 and secured by a nut 172. The stud 171 carries a roller 173 for engaging a cam 174 (Fig. 23) which screws 175 attach to a way plate 155. Cam 174 is provided with a slot 176 (Fig. 21) through which the screws 175 pass so that the cam 174 can be adjusted. A workholder bar 101 begins to engage the bar 167 when it is located about as shown in Fig. 23. The carriage 154 will move with the workholder until disengaged therefrom. The disengagement of the carriage 154 from a bar 101 is effected by the engagement of roller 173 with cam 174 which causes the bar 167 to be retracted from the surface 166 of the workholder bar 101 whereupon the spring 161 pulls the carriage 154 back to its starting position. This back or left movement of the carriage 154 (Fig. 23) is retarded by a dashpot comprising a piston 182 attached to carriage 154 and a cylinder 180 which screws 181 attach to plate 30. The left end of cylinder 180 is closed by a cap 183 having an orifice 184 closed by a plug 185. The retarding action by the dashpot is greatest when the plug 185 is inserted in the cap 183. If less retarding movement is found necessary, the plug can be removed and the cap 183 with proper size orifice can be used without the plug. Retardation of return movement of the carriage 154 is required in order that the flame from the torch will not be blown out. While the workholder 100 and the carriage 154 are traveling together the flame from the torch 151 is heating the twisted leads of copper wire to the melting point so that they fuse together and melt off up to a certain distance from block 110 upon which the leads rest. The portion that is melting off drops through an opening at 190 in channel 38 (Fig. 28) and descends into a tray 191 resting on a shelf 192 (Fig. 5) supported by plate 31. The machine is protected from the heat of the flame by a heat insulating plate 193 (Figs. 5, 27 and 28) attached to a plate 194 welded to the channel 38. The duration of the application of the torch flame to the work is determined by the location of cam 174 (Figs. 21, 23) which can be adjusted. The distances from the twisted, fused leads to the coils $C_1$, $C_2$ are fairly uniform due to the fact that, during twisting, the coils are being drawn toward the block 110 (Fig. 15) while their lower portions are separated by the washers 106.

After the fusing operation, the fused wires are bent around the bar 110 (Fig. 28) by a roller 200 pivoted on a screw 200a threaded into a lever 201 pivotally supported at 202 by a bracket 203 attached to plate 37. Bracket 203 supports a plate 205 carrying a screw 206 connected by a spring 207 with a cotter pin 208 attached to the lever 201. Spring 207 urges the lever 201 against the stop screw 209 threaded through a lug 210 of bracket 203. During movement of the conveyor, the fused lead wires are engaged by the roller 200 and are bent around the block 110. During this operation the block 110 cams rod 200 counterclockwise (Fig. 28) against the action of spring 207.

Prior to the fusing operation the roller 127 (Figs. 14 and 17) passes from the cam plate 128; and, when it does so, the hole in the gear 117 is in registry with the locking lug 119 of the slide 120 so that the pinions 117 of all the workholders are prevented from rotating during the time they pass from the left end of the bar 128, marked 128' in Fig. 1, until they arrive at the plate 135 (Fig. 14) which prevents rotation until the pinion begins to engage the right-hand roller 131. The left end of the track 140 is bent as indicated at 140a (Fig. 4) so as to cause the roller 115 to move from the position 115'' (Fig. 27) to the position shown in 115''' (Fig. 28) thereby locating the eye 114 at its starting position closest to the block 110. As the workholders pass downwardly, as indicated by arrow $b$ (Fig. 1) and to the right, as indicated by arrow $c$, and then up, as indicated by arrow $d$, there is nothing to keep the roller 115 in the position 115'''; but, in order to insure its return to the inmost position before the roller 115 engages the right end of bar 140 a return track 211 is attached to plate 31. At the entrance thereof the track 211 is provided with camming surfaces 212 and 213 (Fig. 4) which guide the wheel 115 into the main groove 214 of the track which places the wheel in position to engage the right end of the track bar 140. During movement of the workholders on the lower run of the conveyor the conveyor chain may sag somewhat but the workholders can engage the plate 52 and the bearing caps 111a can engage the bar 51 (Fig. 7).

The machine is attended by two operators that sit on stools in front of the machine as shown in Fig. 1, their feet resting on the plate 25. The right operator places a right field coil $C_1$ (Fig. 1) in a tray 103 and passes one of its leads W1 through the eye 114. The left operator places the left coil $C_2$ in the tray and passes one of its leads W2 through the eye 114. After the twisting and burning operations have been performed in the manner described, the pair of coils gravitate from the workholder when it is in position 100a (Fig. 1) into a chute 220 supported by angles 221 attached to the plates 30 and 31. The bending of the fused leads about the workholder block 110 locate the leads in a better position for the handling of the coils and also serves to fuse the leads from the eye 114 in case they are not entirely freed from the eye by the fusing operation.

While the embodiment of the present invention as herein disclosed, constitutes a preferred form, it is to be understood that other forms might be adopted, all coming within the scope of the claims which follow.

What is claimed is as follows:

1. A wire-splicing machine for uniting leads of electrical coils comprising a continuously moving conveyor having work-holders for receiving pairs of coils, each work-holder having a rotatable shaft provided with a ring or eye through which the leads to be spliced are passed, a gear connected with the shaft, a fixed rack engaged by the gear for effecting rotation of the shaft during a portion of movement of the work-holder in order to twist the leads together, a latch normally engaging the gear to hold the shaft in a predetermined fixed position, a cam follower connected with the latch, a cam engaged by the follower for retracting the latch before the gear engages the rack, a fixed member engaged by teeth of the gear for preventing rotation thereof from the instant the latch releases it until the gear engages the rack, said rack being of a length such that the gear is located by the rack, as the gear leaves it in said predetermined position, and said cam being of such length that the follower has left it when the gear leaves the rack in order to permit the latch to reengage the gear when in said predetermined position.

2. A wire-splicing machine for uniting leads of electrical coils comprising a continuously moving conveyor having work-holders for receiving pairs of coils, each work-holder having a rotatable shaft provided with a ring or eye through which the leads to be spliced are passed, means for effecting rotation of the shaft during a portion of movement of the work-holder in order to twist the leads together, a second shaft supporting the first shaft, a driving connection between the two shafts which permit axial movement of the first shaft, a disc attached to the first shaft, a gear attached to the second shaft, a fixed rack engaged by the gear to effect rotation of the shafts during a portion of movement of the workholder, means for preventing rotation of the gear except when it engages the rack, a cam engaging the disc to effect axial retraction of the first shaft from the work-holder while the first shaft is rotating and a cam for advancing the first shaft toward the work-holder preparatory to passing the coil leads through the eye of the first shaft.

3. A wire splicing machine for unitary leads of electrical coils comprising a continuously moving conveyor having work holders for receiving a pair of coils, each workholder having a rotatable shaft provided with a ring through which leads to be spliced are passed; a gear associated with the shaft for driving same; a rack engaging the gear for effecting rotation of the shaft during a portion of the movement of the workholder in order to twist the leads together; a disc carried by the shaft; a cam engaging the disc for moving the shaft axially from the workholder while the leads are being twisted together; and a second cam cooperating with the disc to move the shaft toward the workholder preparatory to passing coil leads through the ring.

4. A wire-splicing machine for uniting leads of electrical coils comprising a continuously moving conveyor having workholders for receiving pairs of coils, each work-holder having a rotatable shaft provided with a ring through which the leads to be spliced are passed; gear and rack means for effecting rotation of the shaft during a portion of movement of the workholder in order to twist the leads together; a burner for fusing the twisted leads together; a movable support for the burner, a biased latch associated with the support and located in the path of movement for the workholder, said workholder engaging the latch following the lead twisting movement to move the support so that the burner will fuse leads together; a cam follower connected to the latch; a cam engaged by the follower for retracting the latch after the support has moved a certain distance; and spring means connected with the support for returning same to its starting position.

5. A wire-splicing machine for uniting leads of electrical coils comprising a continuously moving conveyor having workholders for receiving pairs of coils, each work-holder having a rotatable shaft provided with a ring through which the leads to be spliced are passed; gear and rack means for effecting rotation of the shaft during a portion of movement of the workholder in order to twist the leads together; a burner for fusing the twisted leads together; a movable support for the burner; a biased latch associated with the support and located in the path of movement for the workholder, said workholder engaging the latch following the lead twisting movement to move the support so that the burner will fuse leads together; a cam follower connected to the latch; a cam engaged by the follower for retracting the latch after the support has moved a certain distance; spring means connected with the support for returning same to its starting position; and pivoted means for engaging the fused leads for causing the leads to bend away from the ring as the conveyor moves.

RICHARD M. GOODWIN.

REFERENCES CITED

The following references are of record in the file of this patent:

UNITED STATES PATENTS

| Number | Name | Date |
|---|---|---|
| 1,270,129 | Dwiggins | June 18, 1918 |
| 1,336,159 | Rice | Apr. 6, 1920 |
| 1,496,559 | Sleeper | June 3, 1924 |
| 1,911,624 | Kukulenski | May 30, 1933 |
| 1,913,904 | Segur | June 13, 1933 |
| 2,028,225 | Larson | Jan. 21, 1936 |
| 2,249,996 | Wunderlich | July 22, 1941 |
| 2,422,829 | Fotie | June 24, 1947 |